United States Patent
Zhou et al.

(10) Patent No.: US 12,095,707 B2
(45) Date of Patent: Sep. 17, 2024

(54) BEAM SWITCH TIMING FOR A PERIODIC CHANNEL STATE INFORMATION REFERENCE SIGNALS

(71) Applicant: QUALCOMM Incorporated, San Diego, CA (US)

(72) Inventors: Yan Zhou, San Diego, CA (US); Qian Zhang, Basking Ridge, NJ (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/447,150

(22) Filed: Sep. 8, 2021

(65) Prior Publication Data

US 2022/0085958 A1 Mar. 17, 2022

Related U.S. Application Data

(60) Provisional application No. 62/706,916, filed on Sep. 17, 2020.

(51) Int. Cl.
*H04L 5/00* (2006.01)
*H04W 72/21* (2023.01)
*H04W 72/23* (2023.01)

(52) U.S. Cl.
CPC .......... *H04L 5/0085* (2013.01); *H04L 5/0051* (2013.01); *H04W 72/21* (2023.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2020/0382354 A1* | 12/2020 | Sengupta | ............... | H04L 5/001 |
| 2021/0099223 A1* | 4/2021 | Zhang | .................. | H04B 7/0877 |
| 2021/0378004 A1* | 12/2021 | Cirik | ..................... | H04W 16/14 |
| 2022/0022207 A1* | 1/2022 | Matsumura | .......... | H04B 7/0695 |

OTHER PUBLICATIONS

Qualcomm Incorporated, Support of power efficient panel switch UE feature, Jun. 11-14, 2018, 3GPP (Year: 2018).*
3GPP TSG-RAN WG1 Meeting #102-e R1-2007324, Aug. 17-28, 2020 (Year: 2020).*

* cited by examiner

*Primary Examiner* — Jeffrey M Rutkowski
*Assistant Examiner* — Luna Weissberger
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may transmit, to a base station, a first reported beam switch timing value and a second reported beam switch timing value. The UE may receive downlink control information (DCI) associated with an aperiodic channel state information reference signal (CSI-RS). The UE may receive the aperiodic CSI-RS based at least in part on applying a beam indicated in the DCI in accordance with one of the first reported beam switch timing value or the second reported beam switch timing value being based at least in part on one or more of whether tracking reference signal (TRS) information is configured for the UE or whether a repetition is associated with the aperiodic CSI-RS. Numerous other aspects are provided.

29 Claims, 7 Drawing Sheets

BEAM SWITCH TIMING FOR A PERIODIC CHANNEL STATE INFORMATION REFERENCE SIGNALS

CROSS-REFERENCE TO RELATED APPLICATION

This Patent Application claims priority to U.S. Provisional Patent Application No. 62/706,916, filed on Sep. 17, 2020, entitled "BEAM SWITCH TIMING FOR APERIODIC CHANNEL STATE INFORMATION REFERENCE SIGNALS," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically, to techniques and apparatuses for beam switch timing for aperiodic channel state information reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

A UE may report increased aperiodic channel state information reference signal (CSI-RS) beam switch timing values (or aperiodic CSI-RS beam switch latency thresholds), as compared to prior aperiodic CSI-RS beam switch timing values. However, the UE may be configured to report an increased aperiodic CSI-RS beam switch timing value under conflicting conditions. The UE may be configured to apply, under a first condition, the increased aperiodic CSI-RS beam switch timing value to the aperiodic CSI-RS when a high layer repetition parameter is set as "ON" for the aperiodic CSI-RS. The UE may be configured to apply, under a second condition, the increased aperiodic CSI-RS beam switch timing value to the aperiodic CSI-RS without a high layer tracking reference signal (TRS) information parameter being received at the UE, regardless of whether the high layer repetition parameter is set as "ON" or "OFF" for the aperiodic CSI-RS. As a result, the UE may generate an error when attempting to apply the increased aperiodic CSI-RS beam switch timing value due to the conflicting conditions. Since the increased aperiodic CSI-RS beam switch timing value may be beneficial to the UE, since it provides an increased beam switch timing, the error generated at the UE due to the conflicting conditions may negatively affect a performance of the UE.

SUMMARY

In some aspects, a method of wireless communication performed by a user equipment (UE) includes transmitting, to a base station, a first reported beam switch timing value and a second reported beam switch timing value. The method includes receiving, from the base station, downlink control information (DCI) associated with an aperiodic channel state information reference signal (CSI-RS). The method includes receiving, from the base station, the aperiodic CSI-RS based at least in part on applying a beam indicated in the DCI in accordance with one of the first reported beam switch timing value or the second reported beam switch timing value, the one of the first reported beam switch timing value or the second reported beam switch timing value being based at least in part on one or more of whether tracking reference signal (TRS) information is configured for the UE or whether a repetition is associated with the aperiodic CSI-RS.

In some aspects, a method of wireless communication performed by a base station includes receiving, from a UE, a first reported beam switch timing value and a second reported beam switch timing value. The method includes transmitting, to the UE, DCI associated with an aperiodic CSI-RS. The method includes transmitting the aperiodic CSI-RS for reception at the UE in accordance with one of the first reported beam switch timing value or the second reported beam switch timing value based at least in part on one or more of whether TRS information is configured for the UE or whether a repetition is associated with the aperiodic CSI-RS.

In some aspects, a UE for wireless communication includes at least one processor and at least one memory communicatively coupled with the at least one processor and storing processor-readable code that, when executed by the at least one processor, is configured to cause the UE to transmit, to a base station, a first reported beam switch timing value and a second reported beam switch timing value. The processor-readable code that, when executed by the at least one processor, is configured to cause the UE to receive, from the base station, DCI associated with an aperiodic CSI-RS. The processor-readable code that, when executed by the at least one processor, is configured to cause the UE to receive, from the base station, the aperiodic CSI-RS based at least in part on applying a beam indicated in the DCI in accordance with one of the first reported beam switch timing value or the second reported beam switch timing value, the one of the first reported beam switch timing value or the second reported beam switch timing value being based at least in part on one or more of whether TRS information is configured for the UE or whether a repetition is associated with the aperiodic CSI-RS.

In some aspects, a base station for wireless communication includes at least one processor and at least one memory communicatively coupled with the at least one processor and storing processor-readable code that, when executed by the at least one processor, is configured to cause the base station to receive, from a UE, a first reported beam switch timing value and a second reported beam switch timing value. The processor-readable code that, when executed by the at least one processor, is configured to cause the base station to transmit, to the UE, DCI associated with an aperiodic CSI-RS. The processor-readable code that, when executed by the at least one processor, is configured to cause the base station to transmit the aperiodic CSI-RS for reception at the UE in accordance with one of the first reported beam switch timing value or the second reported beam switch timing value based at least in part on one or more of whether TRS information is configured for the UE or whether a repetition is associated with the aperiodic CSI-RS.

In some aspects, a non-transitory computer-readable medium storing a set of instructions for wireless communication includes one or more instructions that, when executed by one or more processors of a UE, cause the UE to transmit, to a base station, a first reported beam switch timing value and a second reported beam switch timing value. The set of instructions for wireless communication includes one or more instructions that, when executed by one or more processors of the UE, cause the UE to receive, from the base station, DCI associated with an aperiodic CSI-RS. The set of instructions for wireless communication includes one or more instructions that, when executed by one or more processors of the UE, cause the UE to receive, from the base station, the aperiodic CSI-RS based at least in part on applying a beam indicated in the DCI in accordance with one of the first reported beam switch timing value or the second reported beam switch timing value, the one of the first reported beam switch timing value or the second reported beam switch timing value being based at least in part on one or more of whether TRS information is configured for the UE or whether a repetition is associated with the aperiodic CSI-RS.

In some aspects, a non-transitory computer-readable medium storing a set of instructions for wireless communication includes one or more instructions that, when executed by one or more processors of a base station, cause the base station to receive, from a UE, a first reported beam switch timing value and a second reported beam switch timing value. The set of instructions for wireless communication includes one or more instructions that, when executed by one or more processors of the base station, cause the base station to transmit, to the UE, DCI associated with an aperiodic CSI-RS. The set of instructions for wireless communication includes one or more instructions that, when executed by one or more processors of the base station, cause the base station to transmit the aperiodic CSI-RS for reception at the UE in accordance with one of the first reported beam switch timing value or the second reported beam switch timing value based at least in part on one or more of whether TRS information is configured for the UE or whether a repetition is associated with the aperiodic CSI-RS.

In some aspects, an apparatus for wireless communication includes means for transmitting, to a base station, a first reported beam switch timing value and a second reported beam switch timing value. The apparatus includes means for receiving, from the base station, DCI associated with an aperiodic CSI-RS. The apparatus includes means for receiving, from the base station, the aperiodic CSI-RS based at least in part on applying a beam indicated in the DCI in accordance with one of the beam switch timing value or the second reported beam switch timing value, the one of the first reported beam switch timing value or the second reported beam switch timing value being based at least in part on one or more of whether TRS information is configured for the apparatus or whether a repetition is associated with the aperiodic CSI-RS.

In some aspects, an apparatus for wireless communication includes means for receiving, from a UE, a first reported beam switch timing value and a second reported beam switch timing value. The apparatus includes means for transmitting, to the UE, DCI associated with an aperiodic CSI-RS. The apparatus includes means for transmitting the aperiodic CSI-RS for reception at the UE in accordance with one of the first reported beam switch timing value or the second reported beam switch timing value based at least in part on one or more of whether TRS information is configured for the UE or whether a repetition is associated with the aperiodic CSI-RS.

Aspects generally include a method, apparatus, system, computer program product, non-transitory computer-readable medium, user equipment, base station, wireless communication device, or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, or packaging arrangements. For example, some aspects may be implemented via integrated chip embodiments or other non-module-component based devices (for example, end-user devices, vehicles, communication devices, computing devices, industrial equipment, retail/purchasing devices, medical devices, or artificial intelligence devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include one or more components for analog and digital purposes (for example, hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
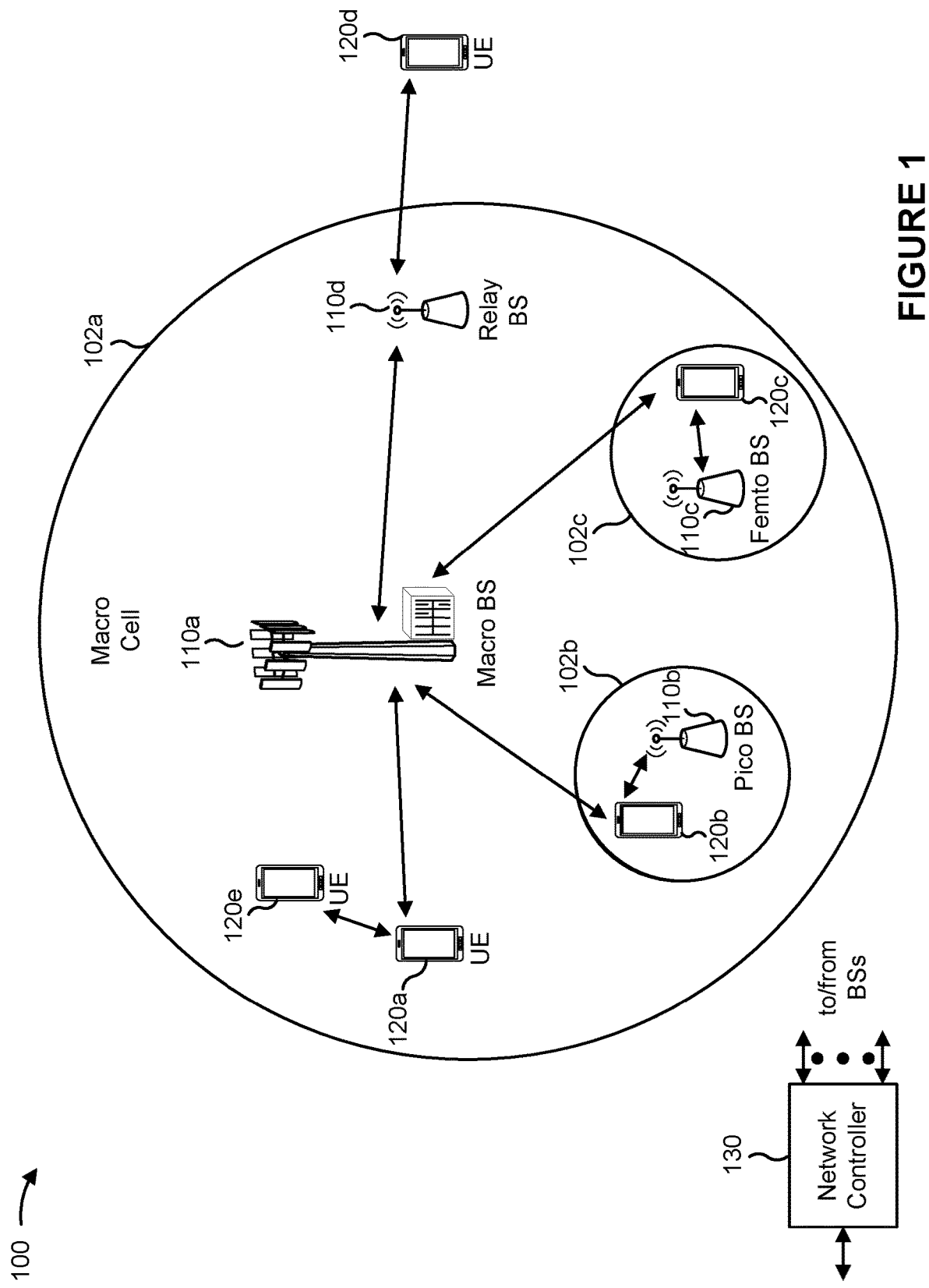
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

Various aspects relate generally to configuring a UE to apply an increased aperiodic channel state information reference signal (CSI-RS) beam switch timing value (or increased aperiodic CSI-RS beam switch latency threshold) when specific conditions are satisfied. Some aspects more specifically relate to configuring the UE to apply the increased aperiodic CSI-RS beam switch timing value based at least in part on whether tracking reference signal (TRS) information is configured for the UE or whether a repetition is associated with the aperiodic CSI-RS. In some aspects, when the UE may not apply the increased aperiodic CSI-RS beam switch timing value depending on the TRS information or the repetition associated with the aperiodic CSI-RS, the UE may instead apply a reduced aperiodic CSI-RS beam switch timing value. In some aspects, the UE may apply the increased aperiodic CSI-RS beam switch timing value when the TRS configuration is not configured for the UE and the repetition is on for the aperiodic CSI-RS. In some aspects, the UE may apply the reduced aperiodic CSI-RS beam switch timing value when the TRS configuration is configured for the UE. In some aspects, the UE may apply the reduced aperiodic CSI-RS beam switch timing value when the TRS configuration is not configured for the UE and the repetition is off for the aperiodic CSI-RS. In some aspects, the UE may apply the reduced aperiodic CSI-RS beam switch timing value when the TRS configuration is not configured for the UE and the repetition is not configured for the aperiodic CSI-RS. In some aspects, the aperiodic CSI-RS may enable beam selection, or beam refinement at the UE or the base station. In some aspects, the CSI-RS may serve as a TRS for the UE.

Particular aspects of the subject matter described in this disclosure can be implemented to realize one or more of the following potential advantages. In some examples, the described techniques can be used to define a UE behavior with respect to the increased aperiodic CSI-RS beam switch timing value. The increased aperiodic CSI-RS beam switch timing value may be beneficial to specific UEs due to an increased beam switch timing for the UE associated with the increased aperiodic CSI-RS beam switch timing value. In some aspects, defining the UE behavior with respect to the increased aperiodic CSI-RS beam switch timing value may resolve conflicting conditions at the UE. For example, defining the UE behavior may aid the UE to resolve conflicting conditions for which the UE is to apply the increased aperiodic CSI-RS beam switch timing value, as opposed to a reduced aperiodic CSI-RS beam switch timing value.

FIG. 1 is a diagram illustrating an example of a wireless network 100, in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (for example, three) cells.

In some examples, a cell may not necessarily be stationary, and the geographic area of the cell may move according to the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110*d* (for example, a relay base station) may communicate with the BS 110*a* (for example, a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

Figure 2:
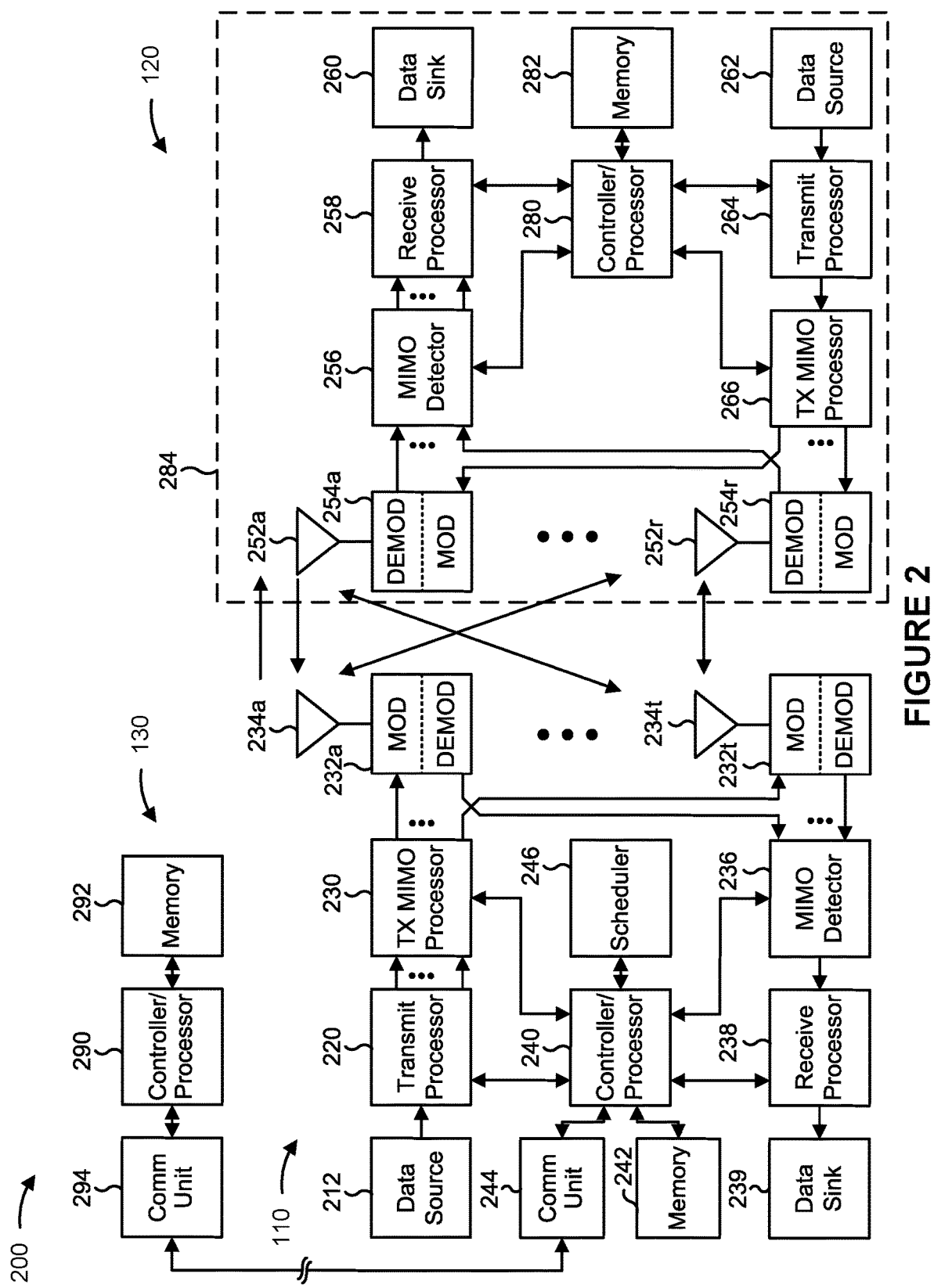
FIG. 2 is a diagram illustrating an example base station (BS) in communication with a user equipment (UE) in a wireless network in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1). The base station may correspond to base station 110 of FIG. 1. Similarly, the UE may correspond to UE 120 of FIG. 1.

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with beam switch timing for aperiodic CSI-RSs, as described in more detail elsewhere herein. For example, the controller/processor 240 of the base station 110, the controller/processor 280 of the UE 120, or any other component(s) of FIG. 2 may perform or direct operations of, for example, process 400 of FIG. 4, process 500 of FIG. 5, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 400 of FIG. 4, process 500 of FIG. 5, or other processes as described herein. In some examples, executing instructions may include running the instructions, converting the instructions, compiling the instructions, or interpreting the instructions, among other examples.

In some aspects, UE 120 may include means for transmitting, to a base station, a first reported beam switch timing value and a second reported beam switch timing value; means for receiving, from the base station, downlink control information (DCI) associated with an aperiodic CSI-RS, means for receiving, from the base station, the aperiodic CSI-RS based at least in part on applying a beam indicated in the DCI in accordance with one of the first reported beam switch timing value or the second reported beam switch timing value, the one of the first reported beam switch timing value or the second reported beam switch timing value being based at least in part on one or more of whether tracking reference signal (TRS) information is configured for the UE or whether a repetition is associated with the aperiodic CSI-RS, among other examples, or combinations thereof. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, or receive processor 258.

In some aspects, base station 110 may include means for receiving, from a UE, a first reported beam switch timing value and a second reported beam switch timing value; means for transmitting, to the UE, DCI associated with an aperiodic CSI-RS, means for transmitting the aperiodic CSI-RS for reception at the UE in accordance with one of the first reported beam switch timing value or the second reported beam switch timing value based at least in part on one or more of whether TRS information is configured for the UE or whether a repetition is associated with the aperiodic CSI-RS, among other examples, or combinations thereof. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, or antenna 234, among other examples.

A UE may report increased aperiodic CSI-RS beam switch timing values (or aperiodic CSI-RS beam switch latency thresholds) of 224 or 336 symbols, as compared to prior aperiodic CSI-RS beam switch timing values of 14, 28, or 48 symbols. An aperiodic CSI-RS beam switch timing value may indicate a minimum time gap (for example, a minimum quantity of symbols) between a DCI and an aperiodic CSI-RS for the UE to apply a downlink beam indicated in the DCI to receive the aperiodic CSI-RS. However, the UE may be configured to report the increased aperiodic CSI-RS beam switch timing value under conflicting conditions. The UE may be configured to apply, under a first condition, the increased aperiodic CSI-RS beam switch timing value of 224 or 336 symbols to the aperiodic CSI-RS when a high layer repetition parameter is set as "ON" for the aperiodic CSI-RS. The UE may be configured to apply, under a second condition, the increased aperiodic CSI-RS beam switch timing value of 224 or 336 symbols to the aperiodic CSI-RS without a high layer TRS information (TRS-Info) parameter being received at the UE, regardless of whether the high layer repetition parameter is set as "ON" or "OFF" for the aperiodic CSI-RS. As a result, the UE may generate an error when attempting to apply the increased aperiodic CSI-RS beam switch timing value due to the conflicting conditions. For example, the UE may generate an error when attempting to apply the increased aperiodic CSI-RS beam switch timing value when the high layer repetition parameter is set as "OFF", when the high layer TRS information parameter is received at the UE, and so on. Since the increased aperiodic CSI-RS beam switch timing value may be beneficial to the UE, since it provides an increased beam switch timing, the error generated at the UE due to the conflicting conditions may negatively affect a performance of the UE.

Various aspects relate generally to configuring the UE to apply the increased aperiodic CSI-RS beam switch timing value (or increased aperiodic CSI-RS beam switch latency threshold) when specific conditions are satisfied. Some aspects more specifically relate to configuring the UE to apply the increased aperiodic CSI-RS beam switch timing value based at least in part on whether TRS information is configured for the UE or whether a repetition is associated with the aperiodic CSI-RS. In some aspects, the UE may apply the increased aperiodic CSI-RS beam switch timing value when the TRS configuration is not configured for the UE and the repetition is off for the aperiodic CSI-RS. The increased aperiodic CSI-RS beam switch timing value may be 224 or 336 symbols. In some aspects, the UE may not apply the increased aperiodic CSI-RS beam switch timing value when the TRS configuration is configured for the UE. In some aspects, the UE may not apply the increased aperiodic CSI-RS beam switch timing value when the TRS configuration is not configured for the UE and the repetition is off for the aperiodic CSI-RS. In some aspects, the UE may not apply the increased aperiodic CSI-RS beam switch timing value when the TRS configuration is not configured for the UE and the repetition is not configured for the aperiodic CSI-RS. In some aspects, when the UE may not apply the increased aperiodic CSI-RS beam switch timing value, the UE may instead apply a reduced aperiodic CSI-RS beam switch timing value, which may be 14, 28, or 48 symbols.

Particular aspects of the subject matter described in this disclosure can be implemented to realize one or more of the following potential advantages. In some examples, the described techniques can be used to define a UE behavior with respect to the increased aperiodic CSI-RS beam switch timing value. The UE may be configured to apply the increased aperiodic CSI-RS beam switch timing value when specific conditions are met, and the UE may otherwise apply the reduced aperiodic CSI-RS beam switch timing value. The increased aperiodic CSI-RS beam switch timing value may be beneficial to specific UEs due to an increased beam switch timing for the UE associated with the increased aperiodic CSI-RS beam switch timing value. In other words, the increased beam switch timing may provide the UE with increased time to apply an indicated downlink beam in DCI.

Figure 3:
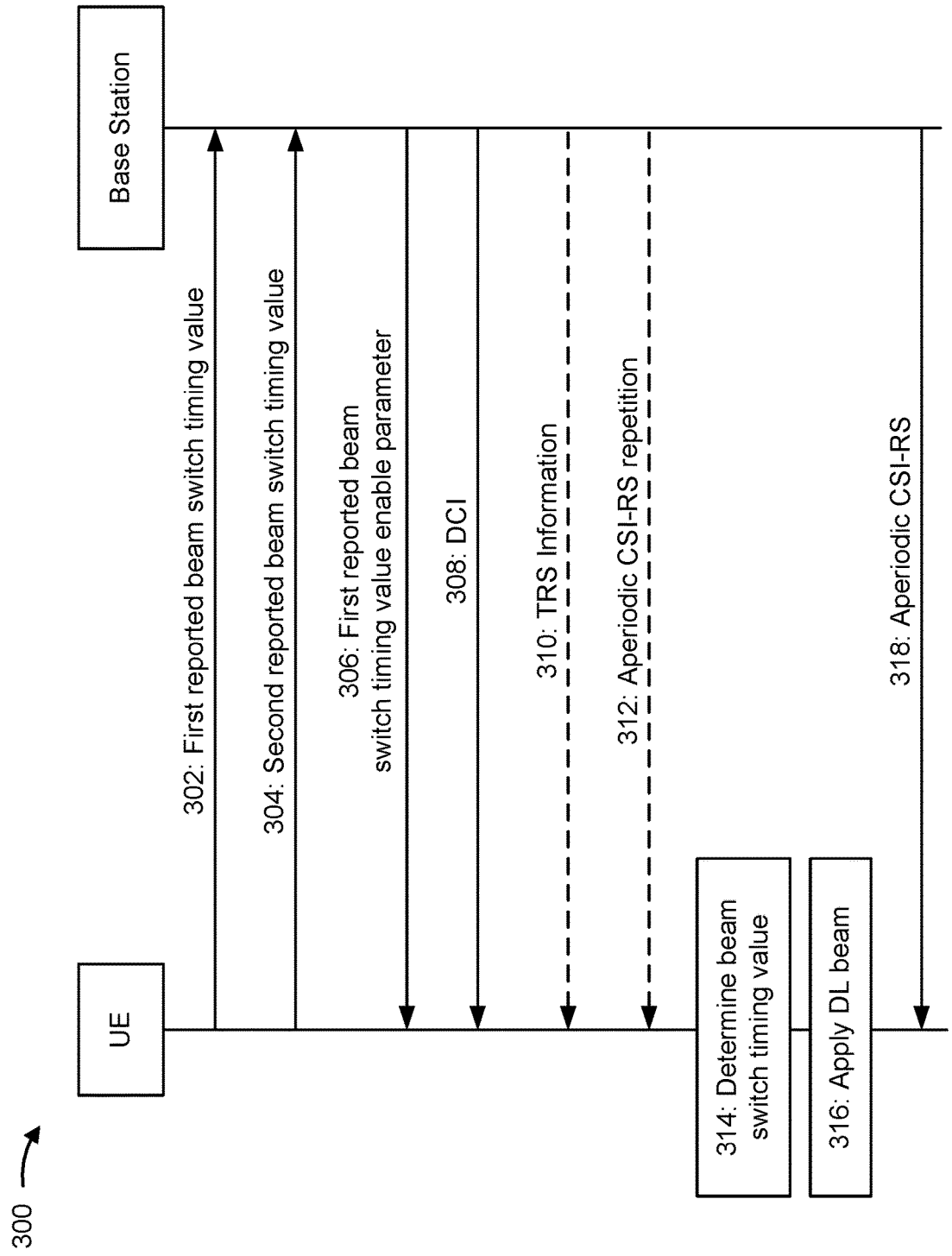
FIG. 3 is a diagram illustrating an example associated with beam switch timing for aperiodic channel state information reference signals (CSI-RSs) in accordance with the present disclosure.

FIG. 3 is a diagram illustrating an example associated with beam switch timing for aperiodic CSI-RSs in accordance with the present disclosure. As shown in FIG. 3, example 300 includes communication between a UE (for example, UE 120) and a base station (for example, base station 110). In some aspects, the UE and the base station may be included in a wireless network such as wireless network 100. The UE and the base station may communicate on a wireless access link, which may include an uplink and a downlink.

In a first operation 302, the UE may transmit a first reported beam switch timing value to the base station. The first reported beam switch timing value may be included in a beam switch timing (beamSwitchTiming) parameter transmitted from the UE to the base station. The first reported beam switch timing value may correspond to a minimum quantity of OFDM symbols between a DCI triggering aperiodic CSI-RS and a corresponding aperiodic CSI-RS transmission in a channel state information (CSI) resource set. In other words, the first reported beam switch timing value may indicate an aperiodic CSI-RS beam switch latency threshold, which may correspond to a minimum time gap (in terms of OFDM symbols) between a scheduling DCI and a scheduling aperiodic CSI-RS for the UE to apply an indicated downlink beam in the scheduling DCI. The first reported beam switch timing value may be 14, 28, or 48 symbols. In some examples, the first reported beam switch timing value may be a value other than 14, 28, or 48 symbols.

In a second operation 304, the UE may transmit a second reported beam switch timing value to the base station. The second reported beam switch timing value may be included in a new beam switch timing (beamSwitchTiming) parameter transmitted from the UE to the base station. For example, the new beam switch timing parameter may be a Release 16 beam switch timing (beamSwitchTiming-r16) parameter. The second reported beam switch timing value may correspond to a minimum quantity of OFDM symbols between a DCI triggering aperiodic CSI-RS and a corresponding aperiodic CSI-RS transmission in a CSI resource set. In other words, the second reported beam switch timing value may indicate an aperiodic CSI-RS beam switch latency threshold, which may correspond to a minimum time gap (in terms of OFDM symbols) between a scheduling DCI and a scheduling aperiodic CSI-RS for the UE to apply an indicated downlink beam in the scheduling DCI. The second reported beam switch timing value may be 224 or 336 symbols. In some examples, the second reported beam switch timing value may be a value other than 224 or 336 symbols.

In some examples, the second reported beam switch timing value may provide the UE with an increased aperiodic CSI-RS beam switch latency threshold as compared to the first reported beam switch timing value. For example, the second reported beam switch timing value may provide the UE with an aperiodic CSI-RS beam switch latency threshold of 224 or 336 symbols, as compared to the first reported beam switch timing value, which may provide the UE with an aperiodic CSI-RS beam switch latency threshold of 14, 28, or 48 symbols. The second reported beam switch timing value may provide the UE with an increased time period to apply the downlink beam indicated in the scheduling DCI, as compared to the first reported beam switch timing value.

In a third operation 306, the UE may receive, from the base station, a high layer parameter that enables the UE to apply the second reported beam switch timing value at the UE. The high layer parameter may be an enableBeamSwitchTiming-r16 parameter. The high layer parameter may enable to the UE to use the second reported beam switch timing value of 224 or 336 symbols.

In a fourth operation 308, the base station may transmit a DCI to the UE over a physical downlink control channel (PDCCH). The DCI may be associated with an aperiodic CSI-RS. For example, the DCI may be a scheduling DCI that schedules the aperiodic CSI-RS. The DCI may trigger the aperiodic CSI-RS to be transmitted from the base station to the UE at a later time. Additionally, the DCI may indicate a downlink beam to be applied by the UE. For example, the DCI may indicate the downlink beam to be applied by the UE to receive the aperiodic CSI-RS from the base station.

In a fifth operation 310, the base station may transmit TRS information to the UE. For example, the base station may transmit a TRS-Info parameter to the UE to indicate the TRS information. The TRS information may be associated with a TRS transmission from the base station to the UE. The TRS transmission may be used for time tracking, frequency tracking, or a path delay spread and Doppler spread. The TRS may be a UE-specific reference signal that is transmitted in four OFDM symbols in two consecutive slots.

In a sixth operation 312, the base station may transmit an aperiodic CSI-RS repetition parameter to the UE. The aperiodic CSI-RS repetition parameter may indicate an aperiodic CSI-RS repetition associated with the aperiodic CSI-RS. In some examples, the aperiodic CSI-RS repetition parameter may indicate when repetition is set as "ON" for the aperiodic CSI-RS, or the aperiodic CSI-RS repetition parameter may indicate when repetition is set as "OFF" for the aperiodic CSI-RS. In other words, the aperiodic CSI-RS repetition parameter may indicate whether a transmission of the aperiodic CSI-RS is to be repeated by the base station.

In a seventh operation 314, the UE may determine a beam switch timing value based at least in part on whether the TRS information is configured for the UE or whether a repetition is associated with the aperiodic CSI-RS. In other words, the UE may determine the beam switch timing value based at least in part on the TRS information or the aperiodic CSI-RS repetition parameter. The TRS information may nor may not be received at the UE. The aperiodic CSI-RS repetition parameter may nor may not be received at the UE. The beam switch timing value may be an actual beam switch timing value to be applied at the UE. The UE may determine that the beam switch timing value corresponds to one of the first reported beam switch timing value or the second reported beam switch timing value, depending on the TRS information or the aperiodic CSI-RS repetition parameter.

In some aspects, the UE may determine that the beam switch timing value for the aperiodic CSI-RS corresponds to the first reported beam switch timing value when the TRS information is configured for the UE. In other words, for aperiodic CSI-RS with the TRS information configured for the UE, the UE may determine that the beam switch timing value (or an actual applied beam switch latency threshold) corresponds to the first reported beam switch timing value (beamSwitchTiming). In this example, the beam switch timing value may be 14, 28, or 48 symbols, and the aperiodic CSI-RS may serve as the TRS for the UE.

In some aspects, the UE may determine that the beam switch timing value for the aperiodic CSI-RS corresponds to the first reported beam switch timing value when the TRS information is not configured for the UE and the aperiodic CSI-RS repetition is configured as "OFF". In other words, for aperiodic CSI-RS with the TRS information not configured for the UE and the aperiodic CSI-RS repetition set to "OFF", the UE may determine that the beam switch timing value (or an actual applied beam switch latency threshold) corresponds to the first reported beam switch timing value. In this example, the beam switch timing value may be 14, 28, or 48 symbols.

Additionally, the aperiodic CSI-RS may be used for beam management. For example, the aperiodic CSI-RS may be used for beam selection and beam refinement at the base station. In other words, the base station may select or refine a beam associated with the UE based at least in part on the aperiodic CSI-RS.

In some aspects, the UE may determine that the beam switch timing value for the aperiodic CSI-RS corresponds to the second reported beam switch timing value when the TRS information is not configured for the UE and the aperiodic CSI-RS repetition is configured as "ON". In other words, for aperiodic CSI-RS with the TRS information not configured for the UE and the aperiodic CSI-RS repetition set to "ON", the UE may determine that the beam switch timing value (or an actual applied beam switch latency threshold) corresponds to the second reported beam switch timing value (beamSwitchTiming-r16). In this example, the beam switch timing value may be 224 or 336 symbols.

Additionally, the aperiodic CSI-RS may be used for beam management. For example, the aperiodic CSI-RS may be used for a UE beam refinement. In other words, the UE may refine a beam based at least in part on the aperiodic CSI-RS received from the base station.

In some aspects, the UE may determine that the beam switch timing value for the aperiodic CSI-RS corresponds to the first reported beam switch timing value when the TRS information is not configured for the UE and the aperiodic CSI-RS repetition is not configured for the UE. In other words, for aperiodic CSI-RS with the TRS information configured for the UE, the UE may determine that the beam switch timing value (or an actual applied beam switch latency threshold) corresponds to the first reported beam switch timing value. In this example, the beam switch timing value may be 14, 28, or 48 symbols. In some aspects, the aperiodic CSI-RS may serve for CSI feedback. In other words, the UE may generate CSI feedback for transmission to the base station based at least in part on the aperiodic CSI-RS.

In an eighth operation 316, the UE may apply the downlink beam indicated in the DCI. The UE may apply the downlink beam to receive the aperiodic CSI-RS from the base station. The UE may apply the downlink beam in accordance with the beam switch timing value. For example, the UE may apply the downlink beam in accordance with the beam switch timing value of 224 or 336 symbols. Alternatively, the UE may apply the downlink beam in accordance with the beam switch timing value of 14, 28, or 48 symbols.

In a ninth operation 318, the UE may receive the aperiodic CSI-RS from the base station. The UE may receive the aperiodic CSI-RS in accordance with the beam switch timing value. For example, the UE may receive the aperiodic CSI-RS based at least in part on applying the downlink beam indicated in the DCI in accordance with the beam switch timing value. The aperiodic CSI-RS may be transmitted from the base station to the UE in a CSI-RS resource set.

Figure 4:
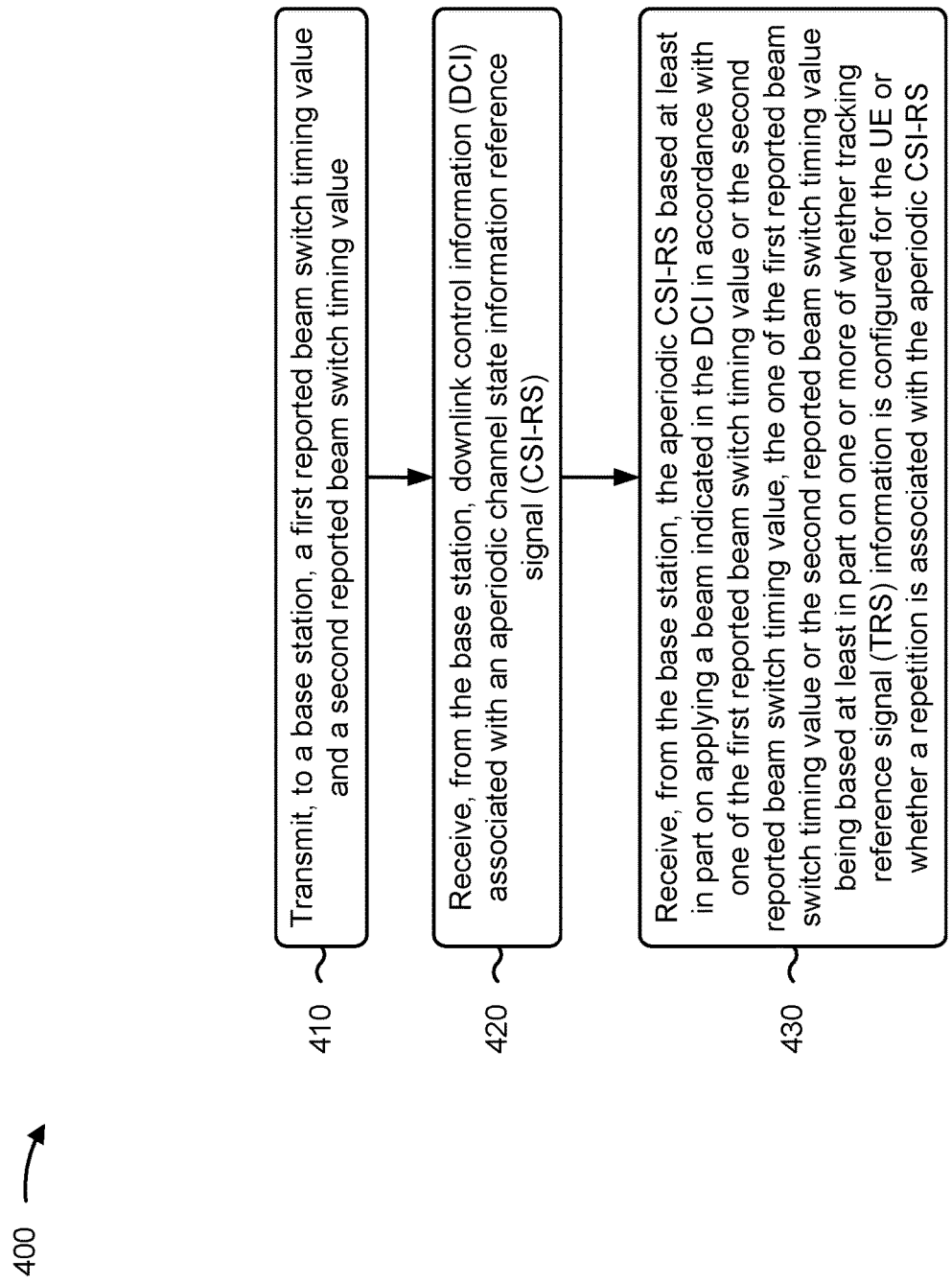
FIG. 4 is a flowchart illustrating an example process performed, for example, by a UE in accordance with the present disclosure.

FIG. 4 is a flowchart illustrating an example process 400 performed, for example, by a UE in accordance with the present disclosure. Example process 400 is an example where the UE (for example, UE 120) performs operations associated with beam switch timing for aperiodic channel state information reference signals.

As shown in FIG. 4, in some aspects, process 400 may include transmitting, to a base station, a first reported beam switch timing value and a second reported beam switch timing value (block 410). For example, the UE (for example, using reception component 602, depicted in FIG. 6) may transmit, to a base station, a first reported beam switch timing value and a second reported beam switch timing value, as described above.

As shown in FIG. 4, in some aspects, process 400 may include receiving, from the base station, DCI associated with an aperiodic CSI-RS (block 420). For example, the UE (for example, using reception component 602, depicted in FIG. 6) may receive, from the base station, DCI associated with an aperiodic CSI-RS, as described above.

As further shown in FIG. 4, in some aspects, process 400 may include receiving, from the base station, the aperiodic CSI-RS based at least in part on applying a beam indicated in the DCI in accordance with one of the first reported beam switch timing value or the second reported beam switch timing value, the one of the first reported beam switch timing value or the second reported beam switch timing value being based at least in part on one or more of whether TRS information is configured for the UE or whether a repetition is associated with the aperiodic CSI-RS (block 430). For example, the UE (for example, using reception component 602, depicted in FIG. 6) may receive, from the base station, the aperiodic CSI-RS based at least in part on applying a beam indicated in the DCI in accordance with one of the first reported beam switch timing value or the second reported beam switch timing value, the one of the first reported beam switch timing value or the second reported beam switch timing value being based at least in part on one or more of whether TRS information is configured for the UE or whether a repetition is associated with the aperiodic CSI-RS, as described above.

Process 400 may include additional aspects, such as any single aspect or any combination of aspects described below or in connection with one or more other processes described elsewhere herein.

In a first additional aspect, the beam switch timing value indicates a minimum quantity of symbols between the DCI and the aperiodic CSI-RS.

In a second additional aspect, alone or in combination with the first aspect, the DCI is configured to schedule the aperiodic CSI-RS.

In a third additional aspect, alone or in combination with one or more of the first and second aspects, the first reported beam switch timing value is one of 224 or 336 symbols.

In a fourth additional aspect, alone or in combination with one or more of the first through third aspects, the second reported beam switch timing value is one of 14, 28, or 48 symbols.

In a fifth additional aspect, alone or in combination with one or more of the first through fourth aspects, the beam switch timing value corresponds to the first reported beam switch timing value when the TRS configuration is not configured for the UE and the repetition is on for the aperiodic CSI-RS.

In a sixth additional aspect, alone or in combination with one or more of the first through fifth aspects, the aperiodic CSI-RS enables a UE beam refinement.

In a seventh additional aspect, alone or in combination with one or more of the first through sixth aspects, the beam switch timing value corresponds to the second reported beam switch timing value when the TRS configuration is configured for the UE.

In an eighth additional aspect, alone or in combination with one or more of the first through seventh aspects, the aperiodic CSI-RS serves as a TRS for the UE.

In a ninth additional aspect, alone or in combination with one or more of the first through eighth aspects, the beam switch timing value corresponds to the second reported beam switch timing value when the TRS configuration is not configured for the UE and the repetition is off for the aperiodic CSI-RS.

In a tenth additional aspect, alone or in combination with one or more of the first through ninth aspects, the beam switch timing value is 48 symbols.

In an eleventh additional aspect, alone or in combination with one or more of the first through tenth aspects, the aperiodic CSI-RS enables a base station beam refinement.

In a twelfth additional aspect, alone or in combination with one or more of the first through eleventh aspects, the beam switch timing value corresponds to the second reported beam switch timing value when the TRS configuration is not configured for the UE and the repetition is not configured for the aperiodic CSI-RS.

In a thirteenth additional aspect, alone or in combination with one or more of the first through twelfth aspects, the aperiodic CSI-RS enables beam selection.

In a fourteenth additional aspect, alone or in combination with one or more of the first through thirteenth aspects, CSI feedback is based at least in part on the aperiodic CSI-RS.

In a fifteenth additional aspect, alone or in combination with one or more of the first through fourteenth aspects, process 400 includes receiving, from the base station, a high layer parameter that enables the first reported beam switch timing value of the UE.

Although FIG. 4 shows example blocks of process 400, in some aspects, process 400 may include additional blocks, fewer blocks, different blocks, or differently arranged blocks than those depicted in FIG. 4. Additionally or alternatively, two or more of the blocks of process 400 may be performed in parallel.

Figure 5:
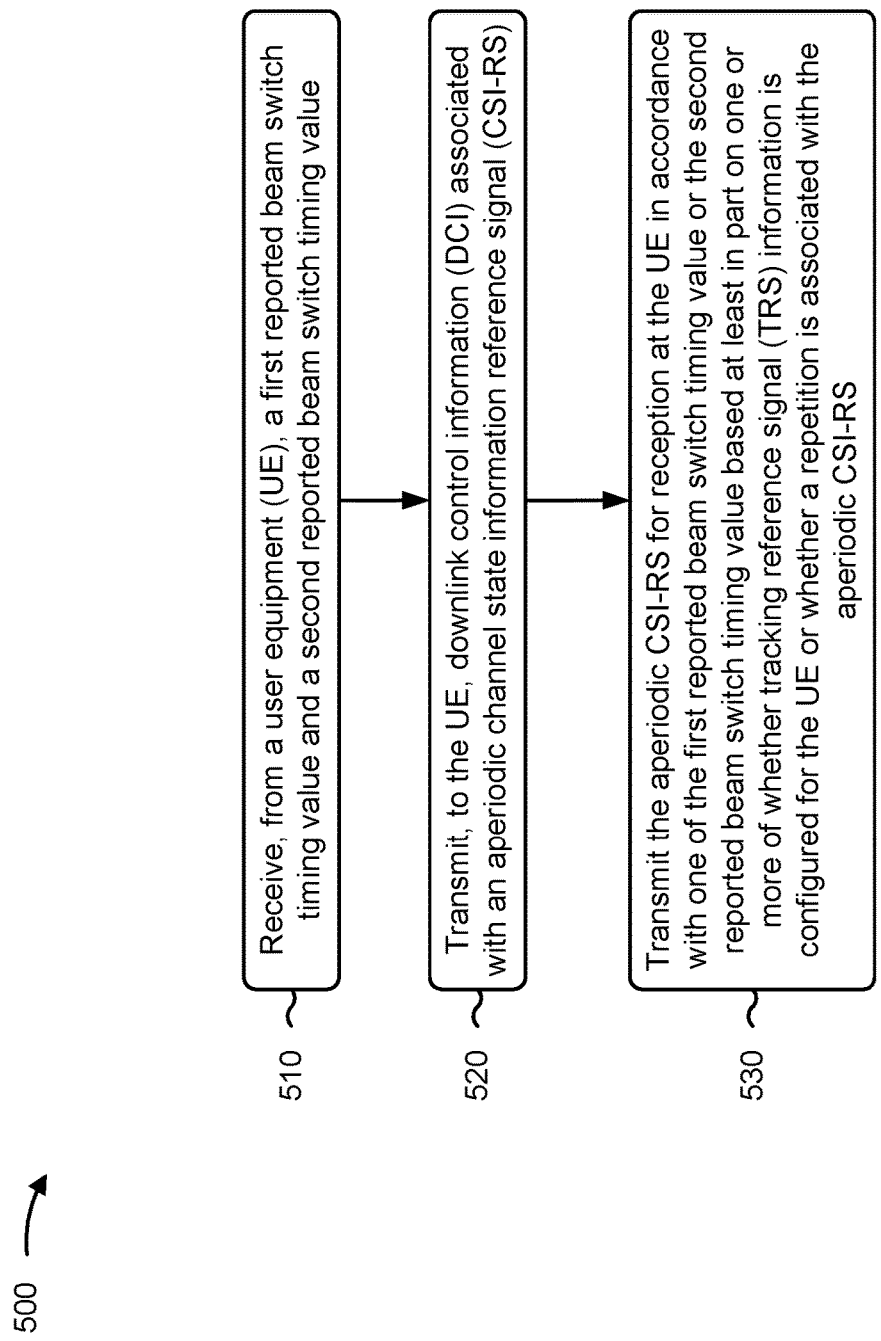
FIG. 5 is a flowchart illustrating an example process performed, for example, by a base station in accordance with the present disclosure.

FIG. 5 is a flowchart illustrating an example process 500 performed, for example, by a base station in accordance with the present disclosure. Example process 500 is an example where the base station (for example, base station 110) performs operations associated with beam switch timing for aperiodic channel state information reference signals.

As shown in FIG. 5, in some aspects, process 500 may include receiving, from a UE, a first reported beam switch timing value and a second reported beam switch timing value (block 510). For example, the base station (for example, using transmission component 706, depicted in FIG. 7) may receive, from a UE, a first reported beam switch timing value and a second reported beam switch timing value, as described above.

As shown in FIG. 5, in some aspects, process 500 may include transmitting, to the UE, DCI associated with an aperiodic CSI-RS (block 520). For example, the base station (for example, using transmission component 706, depicted in FIG. 7) may transmit, to the UE, DCI associated with an aperiodic CSI-RS, as described above.

As further shown in FIG. 5, in some aspects, process 500 may include transmitting the aperiodic CSI-RS for reception at the UE in accordance with one of the first reported beam switch timing value or the second reported beam switch timing value based at least in part on one or more of whether TRS information is configured for the UE or whether a repetition is associated with the aperiodic CSI-RS (block 530). For example, the base station (for example, using transmission component 706, depicted in FIG. 7) may transmit the aperiodic CSI-RS for reception at the UE in accordance with one of the first reported beam switch timing value or the second reported beam switch timing value based at least in part on one or more of whether TRS information is configured for the UE or whether a repetition is associated with the aperiodic CSI-RS, as described above.

Process 500 may include additional aspects, such as any single aspect or any combination of aspects described below or in connection with one or more other processes described elsewhere herein.

In a first additional aspect, the beam switch timing value indicates a minimum quantity of symbols between the DCI and the aperiodic CSI-RS.

In a second additional aspect, alone or in combination with the first aspect, the DCI is configured to schedule the aperiodic CSI-RS.

In a third additional aspect, alone or in combination with one or more of the first and second aspects, the first reported beam switch timing value is one of 224 or 336 symbols.

In a fourth additional aspect, alone or in combination with one or more of the first through third aspects, the second reported beam switch timing value is one of 14, 28, or 48 symbols.

In a fifth additional aspect, alone or in combination with one or more of the first through fourth aspects, the beam switch timing value corresponds to the first reported beam switch timing value when the TRS configuration is not configured for the UE and the repetition is on for the aperiodic CSI-RS.

In a sixth additional aspect, alone or in combination with one or more of the first through fifth aspects, the aperiodic CSI-RS enables a UE beam refinement.

In a seventh additional aspect, alone or in combination with one or more of the first through sixth aspects, the beam switch timing value corresponds to the second reported beam switch timing value when the TRS configuration is configured for the UE.

In an eighth additional aspect, alone or in combination with one or more of the first through seventh aspects, the aperiodic CSI-RS serves as a TRS for the UE.

In a ninth additional aspect, alone or in combination with one or more of the first through eighth aspects, the beam switch timing value corresponds to the second reported beam switch timing value when the TRS configuration is not configured for the UE and the repetition is off for the aperiodic CSI-RS.

In a tenth additional aspect, alone or in combination with one or more of the first through ninth aspects, the beam switch timing value is 48 symbols.

In an eleventh additional aspect, alone or in combination with one or more of the first through tenth aspects, the aperiodic CSI-RS enables a base station beam refinement.

In a twelfth additional aspect, alone or in combination with one or more of the first through eleventh aspects, the beam switch timing value corresponds to the second reported beam switch timing value when the TRS configuration is not configured for the UE and the repetition is not configured for the aperiodic CSI-RS.

In a thirteenth additional aspect, alone or in combination with one or more of the first through twelfth aspects, the aperiodic CSI-RS enables beam selection.

In a fourteenth additional aspect, alone or in combination with one or more of the first through thirteenth aspects, CSI feedback is based at least in part on the aperiodic CSI-RS.

In a fifteenth additional aspect, alone or in combination with one or more of the first through fourteenth aspects, process 500 includes transmitting, to the UE, a high layer parameter that enables the first reported beam switch timing value of the UE.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
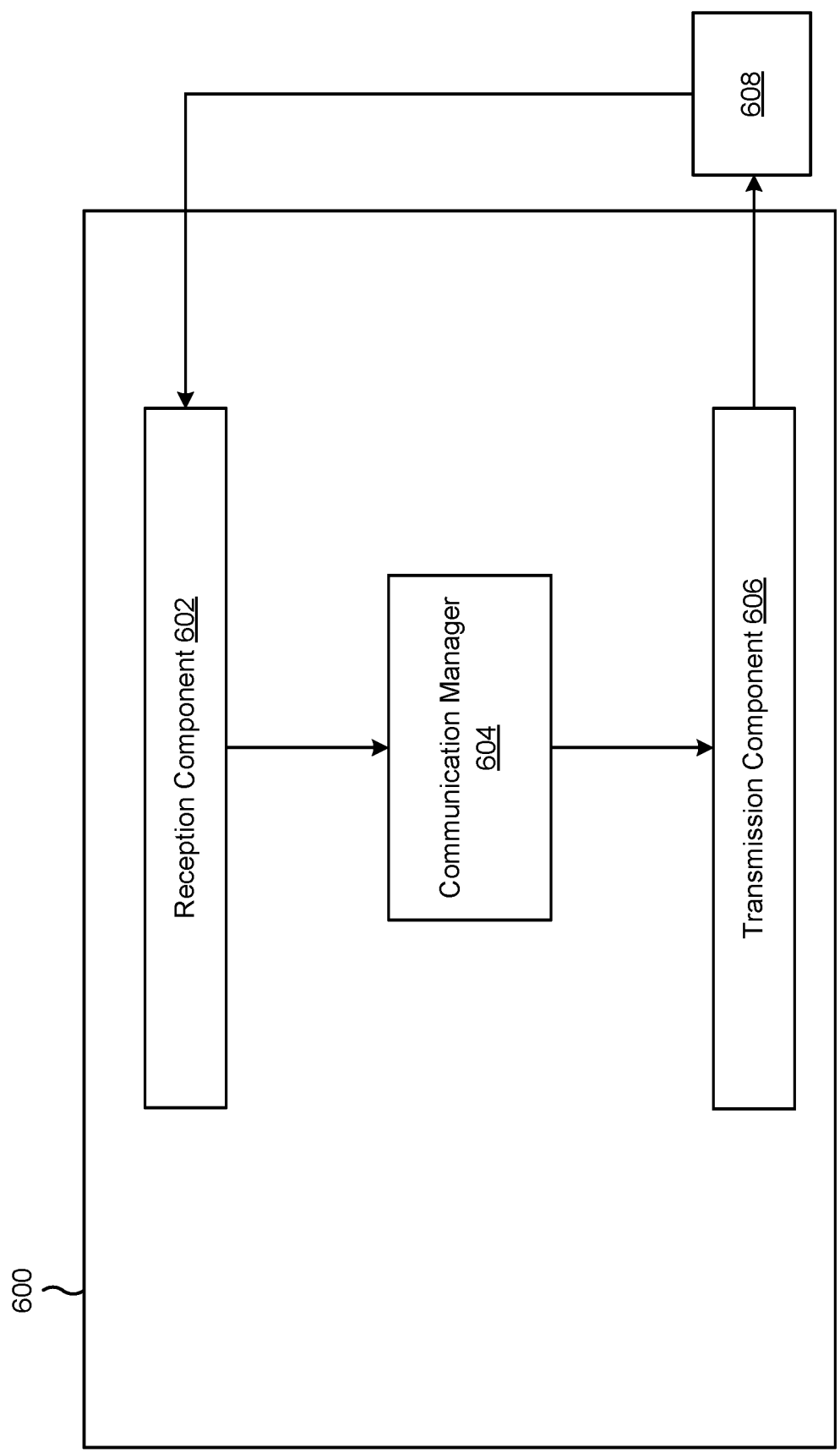
FIGS. 6-7 are block diagrams of example apparatuses for wireless communication in accordance with the present disclosure.

FIG. 6 is a block diagram of an example apparatus 600 for wireless communication in accordance with the present disclosure. The apparatus 600 may be a UE, or a UE may include the apparatus 600. In some aspects, the apparatus 600 includes a reception component 602, a communication manager 604, and a transmission component 606, which may be in communication with one another (for example, via one or more buses). As shown, the apparatus 600 may communicate with another apparatus 608 (such as a UE, a base station, or another wireless communication device) using the reception component 602 and the transmission component 606.

In some aspects, the apparatus 600 may be configured to perform one or more operations described herein in connection with FIG. 3. Additionally or alternatively, the apparatus 600 may be configured to perform one or more processes described herein, such as process 400 of FIG. 4. In some aspects, the apparatus 600 may include one or more components of the UE described above in connection with FIG. 2.

The reception component 602 may receive communications, such as reference signals, control information, data communications, or a combination thereof, from the apparatus 608. The reception component 602 may provide received communications to one or more other components of the apparatus 600, such as the communication manager 604. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 602 may include one or more antennas, a demodulator, a MIMO detector, a receive processor, a controller/processor, a memory, or a combination thereof, of the UE described above in connection with FIG. 2.

The transmission component 606 may transmit communications, such as reference signals, control information, data communications, or a combination thereof, to the apparatus 608. In some aspects, the communication manager 604 may generate communications and may transmit the generated communications to the transmission component 606 for transmission to the apparatus 608. In some aspects, the transmission component 606 may perform signal processing on the generated communications (such as filtering, amplification, modulation, digital-to-analog conversion, multiplexing, interleaving, mapping, or encoding, among other examples), and may transmit the processed signals to the apparatus 608. In some aspects, the transmission component 606 may include one or more antennas, a modulator, a transmit MIMO processor, a transmit processor, a controller/processor, a memory, or a combination thereof, of the UE described above in connection with FIG. 2. In some aspects, the transmission component 606 may be co-located with the reception component 602 in a transceiver.

The communication manager 604 may transmit, or cause the transmission component 606 to transmit, a first reported beam switch timing value and a second reported beam switch timing value. The communication manager 604 may receive, or cause the reception component 602 to receive, from the base station, DCI associated with an aperiodic CSI-RS. The communication manager 604 may receive, or cause the reception component 602 to receive, from the base station, the aperiodic CSI-RS based at least in part on applying a beam indicated in the DCI in accordance with one of the first reported beam switch timing value or the second reported beam switch timing value, the one of the first reported beam switch timing value or the second reported beam switch timing value being based at least in part on one or more of whether tracking reference signal (TRS) information is configured for the UE or whether a repetition is associated with the aperiodic CSI-RS.

In some aspects, the communication manager 604 may include a controller/processor, a memory, a combination thereof, of the UE described above in connection with FIG. 2.

In some aspects, the communication manager 604 may include a set of components, such as a timing value determination component 610. Alternatively, the set of components may be separate and distinct from the communication manager 604. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the reception component 602 may receive, from the base station, a high layer parameter that enables the first reported beam switch timing value of the UE.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

Figure 7:
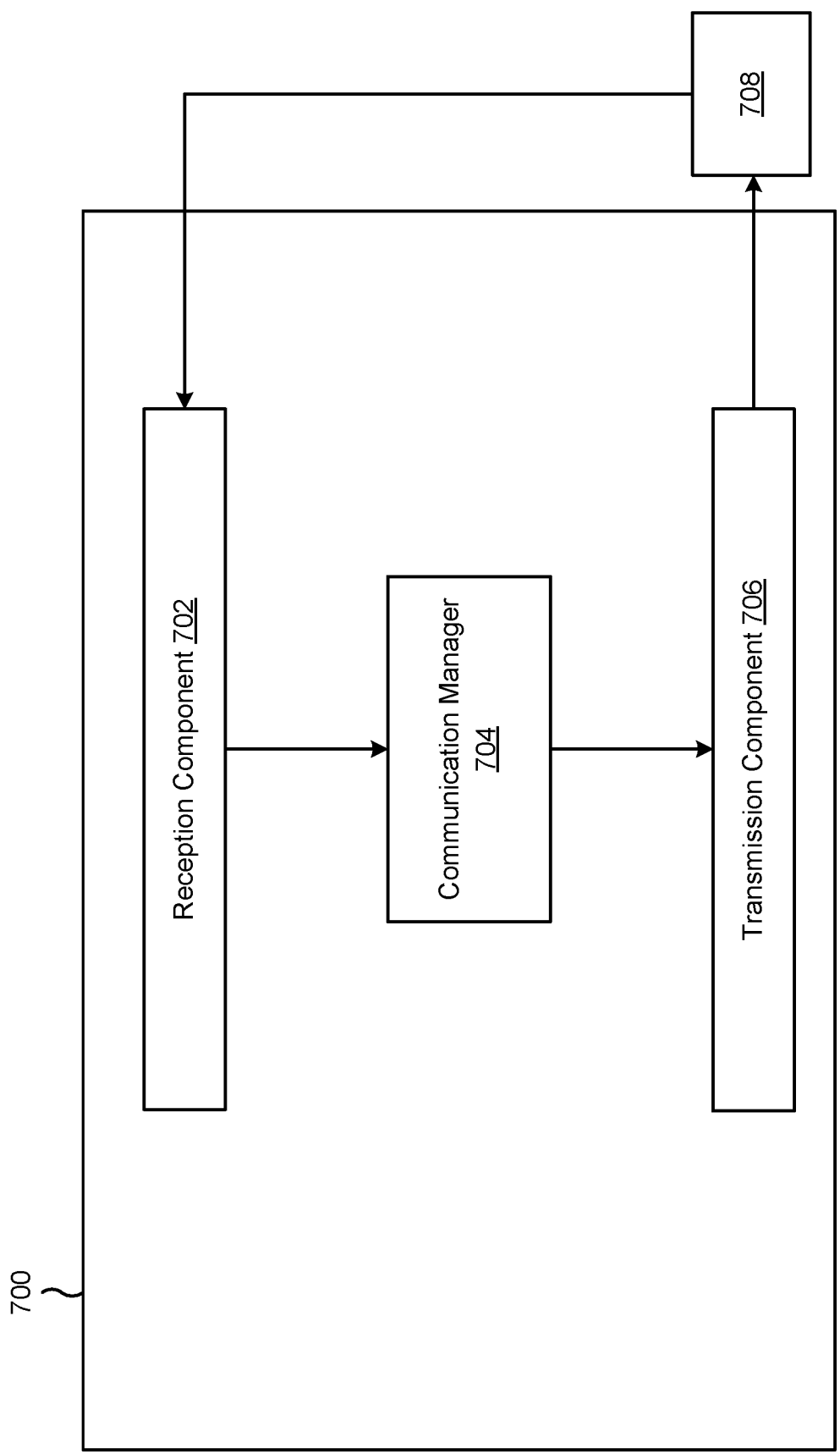

FIG. 7 is a block diagram of an example apparatus 700 for wireless communication in accordance with the present disclosure. The apparatus 700 may be a base station, or a base station may include the apparatus 700. In some aspects, the apparatus 700 includes a reception component 702, a communication manager 704, and a transmission component 706, which may be in communication with one another (for example, via one or more buses). As shown, the apparatus 700 may communicate with another apparatus 708 (such as a UE, a base station, or another wireless communication device) using the reception component 702 and the transmission component 706.

In some aspects, the apparatus 700 may be configured to perform one or more operations described herein in connection with FIG. 3. Additionally or alternatively, the apparatus 700 may be configured to perform one or more processes described herein, such as process 500 of FIG. 5. In some aspects, the apparatus 700 may include one or more components of the base station described above in connection with FIG. 2.

The reception component 702 may receive communications, such as reference signals, control information, data communications, or a combination thereof, from the apparatus 708. The reception component 702 may provide received communications to one or more other components of the apparatus 700, such as the communication manager 704. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the base station described above in connection with FIG. 2.

The transmission component 706 may transmit communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 706 may include one or more antennas, a modulator, a transmit MIMO processor, a transmit processor, a controller/processor, a memory, or a combination thereof, of the base station described above in connection with FIG. 2. In some aspects, the transmission component 706 may be co-located with the reception component 702 in a transceiver.

The communication manager 704 may receive, or cause the reception component 702 to receive, from a UE, a first reported beam switch timing value and a second reported beam switch timing value. The communication manager 704 may transmit, or cause the transmission component 706 to transmit, to the UE, DCI associated with an aperiodic CSI-RS. The communication manager 704 may transmit, or cause the transmission component 706 to transmit, the aperiodic CSI-RS for reception at the UE in accordance with one of the first reported beam switch timing value or the second reported beam switch timing value based at least in part on one or more of whether TRS information is configured for the UE or whether a repetition is associated with the aperiodic CSI-RS. In some aspects, the communication manager 704 may include a controller/processor, a memory, a scheduler, a communication unit, or a combination thereof, of the base station described above in connection with FIG. 2.

In some aspects, the communication manager 704 may include a set of components. Alternatively, the set of components may be separate and distinct from the communication manager 704. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the reception component 702 may receive the first reported beam switch timing value from the UE. In some aspects, the reception component 702 may receive the second reported beam switch timing value from the UE. In some aspects, the transmission component 706 may transmit, to the UE, a high layer parameter that enables the first reported beam switch timing value of the UE The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: transmitting, to a base station, a first reported beam switch timing value and a second reported beam switch timing value; receiving, from the base station, downlink control information (DCI) associated with an aperiodic channel state information reference signal (CSI-RS); and receiving, from the base station, the aperiodic CSI-RS based at least in part on applying a beam indicated in the DCI in accordance with one of the first reported beam switch timing value or the second reported beam switch timing value, the one of the first reported beam switch timing value or the second reported beam switch timing value being based at least in part on one or more of whether tracking reference signal (TRS) information is configured for the UE or whether a repetition is associated with the aperiodic CSI-RS.

Aspect 2: The method of Aspect 1, wherein the first reported beam switch timing value or the second reported beam switch timing value indicates a minimum quantity of symbols between the DCI and the aperiodic CSI-RS.

Aspect 3: The method of any of Aspects 1 through 2, wherein the DCI schedules the aperiodic CSI-RS.

Aspect 4: The method of any of Aspects 1 through 3, wherein: the first reported beam switch timing value is one of 224 or 336 symbols; and the second reported beam switch timing value is one of 14, 28, or 48 symbols.

Aspect 5: The method of any of Aspects 1 through 4, wherein the aperiodic CSI-RS is received based at least in part on applying the beam in accordance with the first reported beam switch timing value based at least in part on the TRS configuration not being configured for the UE and the repetition being on for the aperiodic CSI-RS.

Aspect 6: The method of any of Aspects 1 through 5, further comprising performing a UE beam refinement based at least in part on the aperiodic CSI-RS.

Aspect 7: The method of any of Aspects 1 through 6, wherein the aperiodic CSI-RS is received based at least in part on applying the beam in accordance with the second reported beam switch timing value based at least in part on the TRS configuration being configured for the UE.

Aspect 8: The method of any of Aspects 1 through 7, wherein the aperiodic CSI-RS serves as a TRS for the UE.

Aspect 9: The method of any of Aspects 1 through 8, wherein the aperiodic CSI-RS is received based at least in part on applying the beam in accordance with the second reported beam switch timing value based at least in part on the TRS configuration not being configured for the UE and the repetition being off for the aperiodic CSI-RS.

Aspect 10: The method of any of Aspects 1 through 9, wherein the aperiodic CSI-RS is received based at least in part on applying the beam in accordance with the second reported beam switch timing value based at least in part on the TRS configuration not being configured for the UE and the repetition not being configured for the aperiodic CSI-RS.

Aspect 11: The method of any of Aspects 1 through 10, further comprising transmitting, to the base station, channel state information (CSI) feedback based at least in part on the aperiodic CSI-RS.

Aspect 12: The method of any of Aspects 1 through 11, further comprising receiving, from the base station, a high layer parameter, wherein the first reported beam switch timing value is based at least in part on the high layer parameter.

Aspect 13: A method of wireless communication performed by a base station, comprising: receiving, from a user equipment (UE), a first reported beam switch timing value and a second reported beam switch timing value; transmitting, to the UE, downlink control information (DCI) associated with an aperiodic channel state information reference signal (CSI-RS); and transmitting the aperiodic CSI-RS for reception at the UE in accordance with one of the first reported beam switch timing value or the second reported beam switch timing value based at least in part on one or more of whether tracking reference signal (TRS) information is configured for the UE or whether a repetition is associated with the aperiodic CSI-RS.

Aspect 14: The method of Aspect 13, wherein the first reported beam switch timing value or the second reported beam switch timing value indicates a minimum quantity of symbols between the DCI and the aperiodic CSI-RS.

Aspect 15: The method of any of Aspects 13 through 14, wherein the DCI schedules the aperiodic CSI-RS.

Aspect 16: The method of any of Aspects 13 through 15, wherein: the first reported beam switch timing value is one of 224 or 336 symbols; and the second reported beam switch timing value is one of 14, 28, or 48 symbols.

Aspect 17: The method of any of Aspects 13 through 16, wherein the aperiodic CSI-RS is received based at least in part on applying the beam in accordance with the first reported beam switch timing value based at least in part on the TRS configuration not being configured for the UE and the repetition being on for the aperiodic CSI-RS.

Aspect 18: The method of any of Aspects 13 through 17, further comprising performing a base station beam refinement based at least in part on the aperiodic CSI-RS.

Aspect 19: The method of any of Aspects 13 through 18, wherein the aperiodic CSI-RS is received based at least in part on applying the beam in accordance with the second reported beam switch timing value based at least in part on the TRS configuration being configured for the UE.

Aspect 20: The method of any of Aspects 13 through 19, wherein the aperiodic CSI-RS serves as a TRS for the UE.

Aspect 21: The method of any of Aspects 13 through 20, wherein the aperiodic CSI-RS is received based at least in part on applying the beam in accordance with the second reported beam switch timing value based at least in part on the TRS configuration not being configured for the UE and the repetition being off for the aperiodic CSI-RS.

Aspect 22: The method of any of Aspects 13 through 21, wherein the aperiodic CSI-RS is received based at least in part on applying the beam in accordance with the second reported beam switch timing value based at least in part on the TRS configuration not being configured for the UE and the repetition not being configured for the aperiodic CSI-RS.

Aspect 23: The method of any of Aspects 13 through 22, further comprising receiving, from the UE, channel state information (CSI) feedback based at least in part on the aperiodic CSI-RS.

Aspect 24: The method of any of Aspects 13 through 23, further comprising transmitting, to the UE, a high layer parameter, wherein the first reported beam switch timing value is based at least in part on the high layer parameter.

Aspect 25: An apparatus for wireless communication at a device, comprising a processor; memory coupled with the processor; and instructions stored in the memory and executable by the processor to cause the apparatus to perform the method of one or more of Aspects 1-12.

Aspect 26: A device for wireless communication, comprising a memory and one or more processors coupled to the memory, the one or more processors configured to perform the method of one or more of Aspects 1-12.

Aspect 27: An apparatus for wireless communication, comprising at least one means for performing the method of one or more of Aspects 1-12.

Aspect 28: A non-transitory computer-readable medium storing code for wireless communication, the code comprising instructions executable by a processor to perform the method of one or more of Aspects 1-12.

Aspect 29: A non-transitory computer-readable medium storing a set of instructions for wireless communication, the set of instructions comprising one or more instructions that, when executed by one or more processors of a device, cause the device to perform the method of one or more of Aspects 1-12.

Aspect 30: An apparatus for wireless communication at a device, comprising a processor; memory coupled with the processor; and instructions stored in the memory and executable by the processor to cause the apparatus to perform the method of one or more of Aspects 13-24.

Aspect 31: A device for wireless communication, comprising a memory and one or more processors coupled to the memory, the one or more processors configured to perform the method of one or more of Aspects 13-24.

Aspect 32: An apparatus for wireless communication, comprising at least one means for performing the method of one or more of Aspects 13-24.

Aspect 33: A non-transitory computer-readable medium storing code for wireless communication, the code comprising instructions executable by a processor to perform the method of one or more of Aspects 13-24.

Aspect 34: A non-transitory computer-readable medium storing a set of instructions for wireless communication, the set of instructions comprising one or more instructions that, when executed by one or more processors of a device, cause the device to perform the method of one or more of Aspects 13-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A method of wireless communication performed by a user equipment (UE), comprising:
   transmitting, to a base station, a first reported beam switch timing value and a second reported beam switch timing value;

receiving, from the base station, an enableBeamSwitchTiming parameter that enables the second reported beam switch timing value;

receiving, from the base station, downlink control information (DCI) associated with an aperiodic channel state information reference signal (CSI-RS); and receiving, from the base station, the aperiodic CSI-RS based at least in part on applying a beam indicated in the DCI in accordance with one of the first reported beam switch timing value or the second reported beam switch timing value, the one of the first reported beam switch timing value or the second reported beam switch timing value being based at least in part on whether tracking reference signal (TRS) information is configured for the UE and on whether a repetition parameter is configured for the aperiodic CSI-RS.

2. The method of claim 1, wherein the first reported beam switch timing value or the second reported beam switch timing value indicates a minimum quantity of symbols between the DCI and the aperiodic CSI-RS.

3. The method of claim 1, wherein the DCI schedules the aperiodic CSI-RS.

4. The method of claim 1, wherein:
the second reported beam switch timing value is one of 224 or 336 symbols; and
the first reported beam switch timing value is one of 14, 28, or 48 symbols.

5. The method of claim 1, wherein the aperiodic CSI-RS is received based at least in part on applying the beam in accordance with the second reported beam switch timing value based at least in part on the TRS information not being configured for the UE and the repetition parameter being set to on for the aperiodic CSI-RS.

6. The method of claim 1, further comprising:
performing a UE beam refinement based at least in part on the aperiodic CSI-RS.

7. The method of claim 1, wherein the aperiodic CSI-RS serves as a TRS for the UE.

8. The method of claim 1, wherein the aperiodic CSI-RS is received based at least in part on applying the beam in accordance with the first reported beam switch timing value based at least in part on the TRS information not being configured for the UE and the repetition parameter being set to off for the aperiodic CSI-RS.

9. The method of claim 1, wherein the aperiodic CSI-RS is received based at least in part on applying the beam in accordance with the first reported beam switch timing value based at least in part on the TRS information not being configured for the UE and the repetition parameter not being configured for the aperiodic CSI-RS.

10. The method of claim 1, further comprising:
transmitting, to the base station, channel state information (CSI) feedback based at least in part on the aperiodic CSI-RS.

11. The method of claim 1, wherein the second reported beam switch timing value is based at least in part on the high layer enableBeamSwitchTiming parameter.

12. A method of wireless communication performed by a base station, comprising:
receiving, from a user equipment (UE), a first reported beam switch timing value and a second reported beam switch timing value;
transmitting, to the UE, an enableBeamSwitchTiming parameter that enables the second reported beam switch timing value;

transmitting, to the UE, downlink control information (DCI) associated with an aperiodic channel state information reference signal (CSI-RS); and transmitting the aperiodic CSI-RS for reception at the UE in accordance with one of the first reported beam switch timing value or the second reported beam switch timing value based at least in part on whether tracking reference signal (TRS) information is configured for the UE and on whether a repetition parameter is configured for the aperiodic CSI-RS.

13. The method of claim 12, wherein the first reported beam switch timing value or the second reported beam switch timing value indicates a minimum quantity of symbols between the DCI and the aperiodic CSI-RS.

14. The method of claim 12, wherein the DCI schedules the aperiodic CSI-RS.

15. The method of claim 12, wherein:
the second reported beam switch timing value is one of 224 or 336 symbols; and
the first reported beam switch timing value is one of 14, 28, or 48 symbols.

16. The method of claim 12, wherein the aperiodic CSI-RS is transmitted based at least in part on applying a beam in accordance with the first reported beam switch timing value based at least in part on the TRS information not being configured for the UE and the repetition parameter being set to off for the aperiodic CSI-RS, or
wherein the aperiodic CSI-RS is transmitted based at least in part on applying the beam in accordance with the second reported beam switch timing value based at least in part on the TRS information not being configured for the UE and the repetition parameter being set to on for the aperiodic CSI-RS.

17. The method of claim 12, further comprising:
performing a base station beam refinement based at least in part on the aperiodic CSI-RS.

18. The method of claim 12, wherein the aperiodic CSI-RS serves as a TRS for the UE.

19. The method of claim 12, wherein the aperiodic CSI-RS is transmitted based at least in part on applying a beam in accordance with the first reported beam switch timing value based at least in part on the TRS information not being configured for the UE and the repetition parameter not being configured for the aperiodic CSI-RS.

20. The method of claim 12, further comprising:
receiving, from the UE, channel state information (CSI) feedback based at least in part on the aperiodic CSI-RS.

21. The method of claim 12, wherein the second reported beam switch timing value is based at least in part on the enableBeamSwitchTiming parameter.

22. A user equipment (UE) for wireless communication, comprising:
one or more memories storing processor-readable code; and
one or more processors coupled with the one or more memories and individually or collectively operable to cause the UE to:
transmit, to a base station, a first reported beam switch timing value and a second reported beam switch timing value;
receive, from the base station, an enableBeamSwitchTiming parameter that enables the second reported beam switch timing value;
receive, from the base station, downlink control information (DCI) associated with an aperiodic channel state information reference signal (CSI-RS); and receive, from the base station, the aperiodic CSI-RS based at least in part on a beam indicated in the DCI being applied in accordance with one of the first reported beam switch timing value or the second reported beam switch timing value, the one of the first reported beam switch timing value or the second reported beam switch timing value being based at least in part on whether tracking reference signal (TRS) information is configured for the UE and on whether a repetition parameter is configured for the aperiodic CSI-RS.

23. The UE of claim 22, wherein the first reported beam switch timing value or the second reported beam switch timing value indicates a minimum quantity of symbols between the DCI and the aperiodic CSI-RS.

24. The UE of claim 22, wherein the one or more processors are operable to cause the UE to:
perform a UE beam refinement based at least in part on the aperiodic CSI-RS.

25. A base station for wireless communication, comprising:
one or more memories storing processor-readable code; and
one or more processors coupled with the one or more memories and individually or collectively operable to cause the base station to:
receive, from a user equipment (UE), a first reported beam switch timing value and a second reported beam switch timing value;
transmit, to the UE, an enableBeamSwitchTiming parameter that enables the second reported beam switch timing value;
transmit, to the UE, downlink control information (DCI) associated with an aperiodic channel state information reference signal (CSI-RS); and
transmit the aperiodic CSI-RS for reception at the UE in accordance with one of the first reported beam switch timing value or the second reported beam switch timing value based at least in part on whether tracking reference signal (TRS) information is configured for the UE and on whether a repetition parameter is configured for the aperiodic CSI-RS.

26. The base station of claim 25, wherein the first reported beam switch timing value or the second reported beam switch timing value indicates a minimum quantity of symbols between the DCI and the aperiodic CSI-RS.

27. The base station of claim 25, wherein the one or more processors are operable to cause the base station to:
perform a base station beam refinement based at least in part on the aperiodic CSI-RS.

28. The UE of claim 22, wherein the DCI schedules the aperiodic CSI-RS.

29. The UE of claim 25, wherein:
the first reported beam switch timing value is one of 14, 28, or 48 symbols; and
the second reported beam switch timing value is one of 224 or 336 symbols.

* * * * *